(12) United States Patent
Zhang

(10) Patent No.: US 11,445,508 B2
(45) Date of Patent: *Sep. 13, 2022

(54) METHOD AND DEVICE IN USER EQUIPMENT (UE) AND BASE STATION USED FOR DYNAMIC SCHEDULING

(71) Applicant: APEX BEAM TECHNOLOGIES LLC, Marshall, TX (US)

(72) Inventor: Xiaobo Zhang, Shanghai (CN)

(73) Assignee: APEX BEAM TECHNOLOGIES LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,111

(22) Filed: Jan. 7, 2021

(65) Prior Publication Data

US 2021/0136743 A1   May 6, 2021

Related U.S. Application Data

(63) Continuation of application No. 16/398,207, filed on Apr. 29, 2019, now Pat. No. 10,939,443, which is a
(Continued)

(30) Foreign Application Priority Data

Nov. 1, 2016   (CN) .......................... 201610936764.0

(51) Int. Cl.
*H04W 72/04* (2009.01)
*H04W 72/12* (2009.01)
*H04B 7/0413* (2017.01)

(52) U.S. Cl.
CPC ........ *H04W 72/046* (2013.01); *H04B 7/0413* (2013.01); *H04W 72/0466* (2013.01); *H04W 72/12* (2013.01); *H04W 72/1278* (2013.01)

(58) Field of Classification Search
CPC ........... H04W 72/046; H04W 72/0466; H04W 72/12; H04W 72/1278; H04W 72/1289;
(Continued)

(56) References Cited

U.S. PATENT DOCUMENTS

2011/0222485 A1   9/2011 Nangia
2015/0341914 A1*  11/2015 Lee ....................... H04L 5/0096
                                                              370/329
(Continued)

FOREIGN PATENT DOCUMENTS

CN     102484515 A     5/2012
CN     104320232 A     1/2015
(Continued)

OTHER PUBLICATIONS

CN201610936764.0 Notification to Grant Patent Right for Invention dated Jun. 19, 2020.
CN201610936764.0 1st Office Action dated Sep. 25, 2019.
CN201610936764.0 second Office Action dated Mar. 19, 2020.
ISR received in application No. PCT/CN2017/108033 dated Jan. 12, 2018.

*Primary Examiner* — Thai Nguyen
(74) *Attorney, Agent, or Firm* — Zhong Law, LLC

(57) ABSTRACT

The present disclosure provides a method and device in User Equipment (UE) and a base station for dynamic scheduling. The UE first receives first information; and then receives second information; and operates a first radio signal. Wherein the first information comprises Q field(s), a first field is used to determine a first antenna port set, the first field is one field of the Q field(s). The first antenna port set comprises a positive integer of antenna port(s), the second information is transmitted by an antenna port within the first antenna port set. The first information and the second information are both dynamically configured. The operating refers to receiving, or the operating refers to transmitting. The second information is used to determine scheduling information of the first radio signal. The present disclosure
(Continued)

ensures the robustness of scheduling signaling reception in multi-antenna scenarios, and also avoids excessive overhead, hence improving transmission efficiency.

20 Claims, 13 Drawing Sheets

Related U.S. Application Data continuation of application No. PCT/CN2017/108033, filed on Oct. 27, 2017.

(58) Field of Classification Search
CPC ......... H04W 72/1263; H04W 72/0493; H04W 72/1205; H04W 72/044; H04B 7/0413; H04B 7/0617; H04B 7/0848; H04L 5/0023; H04L 5/0053; H04L 5/0092
See application file for complete search history.

(56) References Cited

U.S. PATENT DOCUMENTS

| | | | |
|---|---|---|---|
| 2016/0212735 A1 | 7/2016 | Nogami | |
| 2019/0261281 A1* | 8/2019 | Jung | H04W 52/146 |
| 2019/0313386 A1* | 10/2019 | Hwang | H04W 72/0446 |
| 2020/0112355 A1* | 4/2020 | Park | H04B 7/0626 |

FOREIGN PATENT DOCUMENTS

| | | | |
|---|---|---|---|
| CN | 105933981 A | 9/2016 | |
| CN | 105992380 A | 10/2016 | |

\* cited by examiner

METHOD AND DEVICE IN USER EQUIPMENT (UE) AND BASE STATION USED FOR DYNAMIC SCHEDULING

CROSS REFERENCE TO RELATED APPLICATION

This application is a continuation of the U.S. application Ser. No. 16/398,207, filed Apr. 29, 2019, which is a continuation of the International Application No. PCT/CN2017/108033, filed Oct. 27,2017, claiming the priority benefit of Chinese Patent Application Number 201610936764.0, filed on Nov. 1, 2016, the full disclosure of which is incorporated by reference.

BACKGROUND

Technical Field

The present disclosure relates to dynamic scheduling schemes in wireless communication systems, and in particular to scheduling schemes for wireless communication systems using multi-antenna technology.

Related Art

Massive Multi-Input Multi-Output (MIMO) becomes a hot topic when studying next generation mobile communications. For the massive MIMO, multiple antennas based on beamforming form a narrow beam which points to a particular direction to improve the quality of communication. Since a beam formed by beamforming of multiple antennas is usually narrow, each side of the communication requires part of the other side's channel information to make the formed beam point to the right direction.

In existing cellular network systems, a base station transmits physical layer control signaling to dynamically schedule a User Equipment (UE). A UE performs blind detection for a scheduling signaling in a search space.

For the Massive MIMO, however, changes in directions in which a beam is transmitted or a beam is received may be very fast due to rotation or movement of a UE. Therefore, how to guarantee robustness of a physical layer control signaling becomes an urgent problem to be solved.

SUMMARY

In view of the above problem, the present disclosure provides a scheme. It should be noted that the embodiments of the UE in the present disclosure and the characteristics in the embodiments of the UE may be applied to the base station, and vice versa. Further, the embodiments of the present disclosure and the characteristics may be mutually combined if no conflict is incurred.

The present disclosure provides a method in a UE for dynamic scheduling, comprising:
  receiving first information;
  receiving second information; and
  operating a first radio signal;
  wherein the first information comprises Q field(s), the Q field(s) corresponds (correspond) to Q target receiver(s) respectively, the UE is a target receiver out of the Q target receiver(s); a first field out of the Q field(s) corresponds to the UE, the first field is used to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer; the operating is receiving, or the operating is transmitting; the second information is used to determine scheduling information of the first radio signal, the scheduling information comprises at least one of time-frequency resources occupied, a transmitting antenna port set, a power control parameter, Modulation and Coding Status (MCS), Redundancy Version (RV), New Data Indicator (NDI), or a Hybrid Automatic Repeat request (HARQ) Process Number; the transmitting antenna port set comprises a positive integer number of antenna port(s).

In one embodiment, the first information is common to a cell.

In one embodiment, the first information is specific to a UE group. The UE group comprises one or more UEs.

In one embodiment, the first information comprises less information for the UE, the second information comprises more information for the UE. Therefore, the first information is transmitted by a wider beam or via beam sweeping so as to avoid failure caused by misalignment between a transmitting beam and a receiving beam. The second information is transmitted by a narrower beam to improve transmission efficiency.

In one embodiment, the Q is greater than 1.

In one embodiment, the phrase that the first information and the second information are both dynamically configured refers to: the first information is carried by a physical layer signaling, and the second information is carried by a physical layer signaling.

In one embodiment, the phrase that the first information and the second information are both dynamically configured refers to: the first information is transmitted on a Physical Downlink Control Channel (PDCCH) or an enhanced PDCCH (ePDCCH), and the second information is transmitted on a PDCCH or ePDCCH.

In one embodiment, the phrase that the first information and the second information are both dynamically configured refers to: the first information and the second information are Downlink Control Information (DCI) respectively.

In one embodiment, the first information is carried by a feature sequence.

In one subembodiment, the feature sequence comprises at least one of a Zadoff-Chu sequence, or a pseudo random sequence.

In one embodiment, the operating is receiving, the first radio signal is transmitted on a downlink physical layer data channel (i.e., a downlink channel that can carry physical layer data). In one subembodiment, the downlink physical layer data channel is a Physical Downlink Shared Channel (PDSCH). In one subembodiment, the downlink physical layer data channel is a short PDSCH.

In one embodiment, the operating is transmitting, the first radio signal is transmitted on an uplink physical layer data channel (i.e., an uplink channel that can carry physical layer data). In one subembodiment, the uplink physical layer data channel is a Physical Uplink Shared Channel (PUSCH). In one subembodiment, the uplink physical layer data channel is a short PUSCH (sPUSCH).

In one embodiment, the Q is 1.

In one embodiment, the target receiver is a terminal.

In one embodiment, the field comprises L1 information bit(s).

In one subembodiment, the L1 information bit(s) indicates(indicate) an antenna port set out of L2 candidate antenna port set(s), the L2 is equal to the L1 power of 2, the L1 is a positive integer.

In one subembodiment, the L1 is 2.

In one subembodiment, the L1 is configurable.

In one embodiment, the power control parameter is commanded by Transmitted Power Control (TPC).

In one embodiment, the Q is configurable.

According to one aspect of the present disclosure, comprising:

receiving third information;

wherein the third information is used to determine at least one of a position of the first field in the Q field(s), or a first ID; the first ID is an integer, the first ID is used to determine at least one of CRC bits for the first information, scrambling codes for the first information, or a scrambling code sequence for the first information.

In one embodiment, the first ID comprises 16 bits.

In one embodiment, the first ID is a Radio Network Temporary Identifier (RNTI).

In one embodiment, the CRC bits for the first information are scrambled by the first ID.

In one embodiment, the phrase that the first information is scrambled by the first ID refers to that the first ID is a scrambling sequence for the first information.

In one embodiment, the third information is semi-statically configured.

In one embodiment, the third information is carried by a higher-layer signaling.

In one embodiment, the first ID is a candidate ID in P2 candidate IDs, the P2 is a positive integer greater than 1.

According to one aspect of the present disclosure, wherein P1 antenna port sets are respectively used for P1 transmissions of the first information, the P1 is a positive integer greater than 1, each of the P1 antenna port sets comprises a positive integer number of antenna port(s).

In one embodiment, any one transmission of the P1 transmissions is self-decoded, i.e., any one transmission of the P1 transmissions includes whole information of the first information.

In one embodiment, any two antenna port sets of the P1 antenna port sets comprise an equal number of antenna port(s).

In one embodiment, the P1 antenna port sets correspond to P1 analog beamforming vectors respectively.

The above embodiments ensure the reception robustness of the first information. Considering that the first information has a smaller payload, the above embodiments manage to reach a balance between redundancy and performance.

In one embodiment, time domain resources occupied by Reference Signals (RSs) corresponding to any two antenna port sets of the P1 antenna port sets are orthogonal, namely, not overlapping.

In one embodiment, the P1 transmissions of the first information are Time Division Multiplexing (TDM).

In one embodiment, time domain resources occupied by any two transmissions of the P1 transmissions of the first information are orthogonal, namely, not overlapping.

In one embodiment, the first antenna port set comprises P5 antenna port subsets, each antenna port subset of the P5 antenna port subsets comprises a positive integer number of antenna(s), the P5 antenna port subsets are respectively used for P5 transmissions of the second information, the P5 is a positive integer; The P5 is greater than 1.

In one subembodiment of the above embodiment, time domain resources occupied by any two transmissions of the P5 transmissions are orthogonal.

In one subembodiment of the above embodiment, time domain resources occupied by at least two transmissions of the P5 transmissions are equal, frequency domain occupied by the two transmissions are orthogonal.

According to one aspect of the present disclosure, comprising:

detecting target information identified by the first ID in a first time-frequency resource pool;

wherein the first ID is used to determine at least one of CRC bits for the target information, scrambling codes for the target information, or a scrambling code sequence for the target information; the first information is the target information which is latest detected prior to the second information within the first time-frequency resource pool; the first ID is an integer.

In one embodiment, the above aspect ensures that the UE determines the first antenna port set according to the target information (i.e., the first information) latest received. The above aspect reduces radio resources occupied by the target information, thus improving transmission efficiency.

In one embodiment, the UE determines a position of time-frequency resources occupied by the target information in the first time-frequency resource pool through blind detection.

In one embodiment, time domain resources occupied by the first time-frequency resources pool are discrete.

In one embodiment, time domain resources occupied by the first time-frequency resources pool are equally-spaced.

In one embodiment, time domain resources occupied by the first time frequency resource pool are configured by a higher-layer signaling.

In one subembodiment, the higher-layer signaling is common to a cell.

In one embodiment, the Q is 1.

According to one aspect of the present disclosure, wherein the first field is further used to determine a first vector group, the first vector group comprises R1 target vector(s), the R1 target vector(s) is(are) used for reception beamforming for the second information; the R1 is a positive integer.

In the above aspect, the first information can indicate directions of transmitting beam and receiving beam for the second information simultaneously, which further enhances the reception performance of the second information.

In one embodiment, the R1 is 1.

In one embodiment, each antenna port set of the P1 antenna port sets is related to one of the target vector(s).

In one embodiment, the R1 target vector(s) comprises (comprise) P3 element(s), one of the R1 target vector(s) is used to form a receiving beam. For a given target vector, the receiving beam refers to: radio signals received by P3 antenna(s) equipped for the UE are multiplied by the P3 element(s) in the given target vector(s) and then added up. The P3 is a positive integer.

In one subembodiment of the above embodiment, the P3 elements have equal amplitude.

According to one aspect of the present disclosure, comprising:

receiving a downlink RS, the downlink RS is transmitted by P2 antenna port sets;

wherein the P2 is a positive integer greater than or equal to the P1, each of the P2 antenna port sets comprises a positive integer number of antenna port(s). The P1 antenna port sets are a subset of the P2 antenna port sets.

In one embodiment, the downlink RS comprises a positive integer number of RS port(s), each of the RS port(s) is transmitted by each of the antenna port(s) in the P2 antenna port sets.

In one subembodiment, the RS port(s) is(are) Channel Status Information Reference Signal (CSI-RS) port(s).

In one subembodiment, patterns of the RS port(s) in a Physical Resource Block (PRB) are patterns of CSI-RS port(s) in a PRB.

In one subembodiment, patterns of the RS port(s) in a unit of time-frequency resources are patterns of CSI-RS port(s) in a unit of time-frequency resources. The unit of time-frequency resources occupies 1 ms in time domain, and a bandwidth occupied in frequency domain is LTE system bandwidth.

According to one aspect of the present disclosure, comprising:

transmitting a second radio signal;

wherein the second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1.

In one embodiment, the above aspect indicates the direction of a downlink receiving beam via an uplink radio signal, particularly applicable to scenarios with Channel Reciprocity.

In one embodiment, the second radio signal comprises R2 RS port(s), the R2 RS port(s) is(are) respectively transmitted by the R2 antenna port(s).

In one subembodiment, the RS port(s) is(are) Sounding Reference Signal (SRS) port(s).

In one subembodiment, patterns of the RS port(s) in an Orthogonal Frequency Division Multiplexing (OFDM) symbol are patterns of SRS port(s) in the OFDM symbol.

In one subembodiment, patterns of the RS port(s) in an OFDM symbol are patterns of UL DMRS port(s) in the OFDM symbol.

In one embodiment, the antenna port(s) is(are) formed by multiple antennas through antenna virtualization superposition, a mapping coefficient of the multiple antennas to the antenna port constitutes the antenna virtualization vector. In one subembodiment, the beamforming vector corresponding to a first antenna port and the beamforming vector corresponding to a second antenna port cannot be assumed to be the same, the first antenna port and the second antenna port are any two different antenna ports. In one subembodiment, small scale characteristics of a radio channel experienced by signals transmitted from a first antenna port cannot be used to infer small scale characteristics of a radio channel experienced by signals transmitted from a second antenna port.

According to one aspect of the present disclosure, comprising:

Transmitting fourth information;

Wherein the fourth information is used to determine at least one of the first antenna port set, or the P1 antenna port sets.

In one embodiment, the fourth information is transmitted on a physical layer channel.

In one embodiment, the fourth information comprises at least one of CSI-RS Resource Indicator (CRI), Rank Indicator (RI), Precoding Type Indicator (PTI), PMI (Precoding Matrix Indicator), Channel Quality Indicator (CQI), uplink Reference Signal (RS), or uplink Preamble.

In one embodiment, the fourth information is Channel Status Information (CSI).

In one embodiment, the fourth information is also used to determine the scheduling information of the first radio signal.

The present disclosure provides a method in a base station for dynamic scheduling, comprising:

transmitting first information;

transmitting second information; and executing a first radio signal;

wherein the first information comprises Q field(s), the Q field(s) corresponds(correspond) to Q target receiver(s) respectively, a receiver of the second information is a target receiver out of the Q target receiver(s); a first field out of the Q field(s) corresponds to the receiver of the second information, the first field is used to determine a first antenna port set, the first field is a field of the Q field(s); the first antenna port set comprises a positive integer number of antenna port(s), the second information is transmitted by antenna port(s) within the first antenna port set; the first information and the second information are both dynamically configured; the Q is a positive integer; the executing is transmitting, or the executing is receiving; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

According to one aspect of the present disclosure, comprising:

transmitting third information;

wherein the third information is used to determine at least one of a position of the first field in the Q field(s), or a first ID; the first ID is an integer, the first ID is used to determine at least one of CRC codes for the first information, scrambling codes for the first information, or a scrambling code sequence for the first information.

According to one aspect of the present disclosure, wherein P1 antenna port sets are respectively used for P1 transmissions of the first information, the P1 is a positive integer greater than 1, each of the P1 antenna port sets comprises a positive integer number of antenna port(s).

According to one aspect of the present disclosure, comprising:

transmitting one piece or multiple pieces of target information in a first time-frequency resource pool;

wherein the first ID is used to determine at least one of CRC codes for the first information, scrambling codes for the first information, or a scrambling code sequence for the first information; the first information is the target information which is latest transmitted prior to the second information within the first time-frequency resource pool; the first ID is an integer.

In one embodiment, the multiple pieces of target information are separate.

In one embodiment, any two of the multiple pieces of target information cannot be assumed to be the same.

In one embodiment, the base station self-determines a position of time-frequency resources occupied by the target information in the first time-frequency resource pool.

According to one aspect of the present disclosure, wherein the first field is further used to determine a first vector group, the first vector group comprises R1 target vector(s), the R1 target vector(s) is(are) used for reception beamforming for the second information; the R1 is a positive integer.

According to one aspect of the present disclosure, comprising:

transmitting a downlink RS, the downlink RS is transmitted by P2 antenna port sets;

wherein the P2 is a positive integer greater than or equal to the P1, each of the P2 antenna port sets comprises a positive integer number of antenna port(s); the P1 antenna port sets are a subset of the P2 antenna port sets.

According to one aspect of the present disclosure, comprising:

receiving a second radio signal;

wherein the second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1; the executing is transmitting.

According to one aspect of the present disclosure, comprising:

receiving fourth information;

wherein the fourth information is used to determine at least one of the first antenna port set, or the P1 antenna port sets, the executing is transmitting.

The present disclosure provides a UE for dynamic scheduling, comprising:

a first processor, receiving first information;
a first receiver, receiving second information; and
a second processor, operating a first radio signal;

wherein the first information comprises Q field(s), the Q field(s) corresponds (correspond) to Q target receiver(s) respectively, the UE is a target receiver out of the Q target receiver(s); a first field out of the Q field(s) corresponds to the UE, the first field is used to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer; the operating is receiving, or the operating is transmitting; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the above UE is characterized in that the first processor further receives third information; wherein the third information is used to determine at least one of a position of the first field in the Q field(s), or a first ID; the first ID is an integer, the first ID is used to determine at least one of CRC codes for the first information, scrambling codes for the first information, or a scrambling code sequence for the first information.

In one embodiment, the above UE is characterized in that P1 antenna port sets are respectively used for P1 transmissions of the first information, the P1 is a positive integer greater than 1, each of the P1 antenna port sets comprises a positive integer number of antenna port(s).

In one embodiment, the above UE is characterized in that the first processor further detects target information identified by the first ID in a first time-frequency resource pool; wherein the first ID is used to determine at least one of CRC bits for the first information, scrambling codes for the first information, or a scrambling code sequence for the first information; the first information is the target information which is latest detected prior to the second information within the first time-frequency resource pool; the first ID is an integer.

In one embodiment, the above UE is characterized in that the first field is further used to determine a first vector group, the first vector group comprises R1 target vector(s), the R1 target vector(s) is(are) used for reception beamforming for the second information; the R1 is a positive integer.

In one embodiment, the above UE is characterized in that the first processor also receives a downlink RS, the downlink RS is transmitted by P2 antenna port sets; wherein the P2 is a positive integer greater than or equal to the P1, each of the P2 antenna port sets comprises a positive integer of antenna port(s); the P1 antenna port sets are a subset of the P2 antenna port sets.

In one embodiment, the above UE is characterized in that the first processor also transmits a second radio signal; wherein the second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1.

In one embodiment, the above UE is characterized in that the first processor also transmits fourth information; wherein the fourth information is used to determine at least one of the first antenna port set, or the P1 antenna port sets.

The present disclosure provides a base station for dynamic scheduling, comprising:

a third processor, transmitting first information;
a first transmitter, transmitting second information; and
a fourth processor, executing a first radio signal;

wherein the first information comprises Q field(s), the Q field(s) corresponds(correspond) to Q target receiver(s) respectively, a receiver of the second information is a target receiver out of the Q target receiver(s); a first field out of the Q field(s) corresponds to the receiver of the second information, the first field is used to determine a first antenna port set, the first field is a field of the Q field(s); the first antenna port set comprises a positive integer number of antenna port(s), the second information is transmitted by antenna port(s) within the first antenna port set; the first information and the second information are both dynamically configured; the Q is a positive integer; the executing is transmitting, or the executing is receiving; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the above base station is characterized in that the third processor further transmits third information; wherein the third information is used to determine at least one of a position of the first field in the Q field(s), or a first ID; the first ID is an integer, the first ID is used to determine at least one of CRC codes for the first information, scrambling codes for the first information, or a scrambling code sequence for the first information.

In one embodiment, the above base station is characterized in that P1 antenna port sets are respectively used for P1 transmissions of the first information, the P1 is a positive integer greater than 1, each of the P1 antenna port sets comprises a positive integer number of antenna port(s)

In one embodiment, the above base station is characterized in that the third processor also transmits one or multiple pieces of target information in a first time-frequency resource pool; wherein the first ID is used to determine at least one of CRC bits for the target information, scrambling codes for the target information, or a scrambling code sequence for the target information; the first information is the target information which is latest transmitted prior to the second information within the first time-frequency resource pool; the first ID is an integer.

In one embodiment, the above base station is characterized in that the first field is further used to determine a first vector group, the first vector group comprises R1 target vector(s), the R1 target vector(s) is(are) used for reception beamforming for the second information; the R1 is a positive integer.

In one embodiment, the above base station is characterized in that the third processor also transmits a downlink RS, the downlink RS is transmitted by P2 antenna port sets; wherein the P2 is a positive integer greater than or equal to the P1, each of the P2 antenna port sets comprises a positive integer of antenna port(s); the P1 antenna port sets are a subset of the P2 antenna port sets.

In one embodiment, the above base station is characterized in that the third processor also receives a second radio signal; wherein the second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1; the executing is transmitting.

In one embodiment, the above base station is characterized in that the third processor further receives fourth information; wherein the fourth information is used to determine at least one of the first antenna port set, or the P1 antenna port sets or at least one of its groups, the executing is transmitting.

BRIEF DESCRIPTION OF THE DRAWINGS

Other features, objects and advantages of the present disclosure will become more apparent from the detailed description of non-restrictive embodiments taken in conjunction with the following drawings.

EMBODIMENT 1

Figure 1:
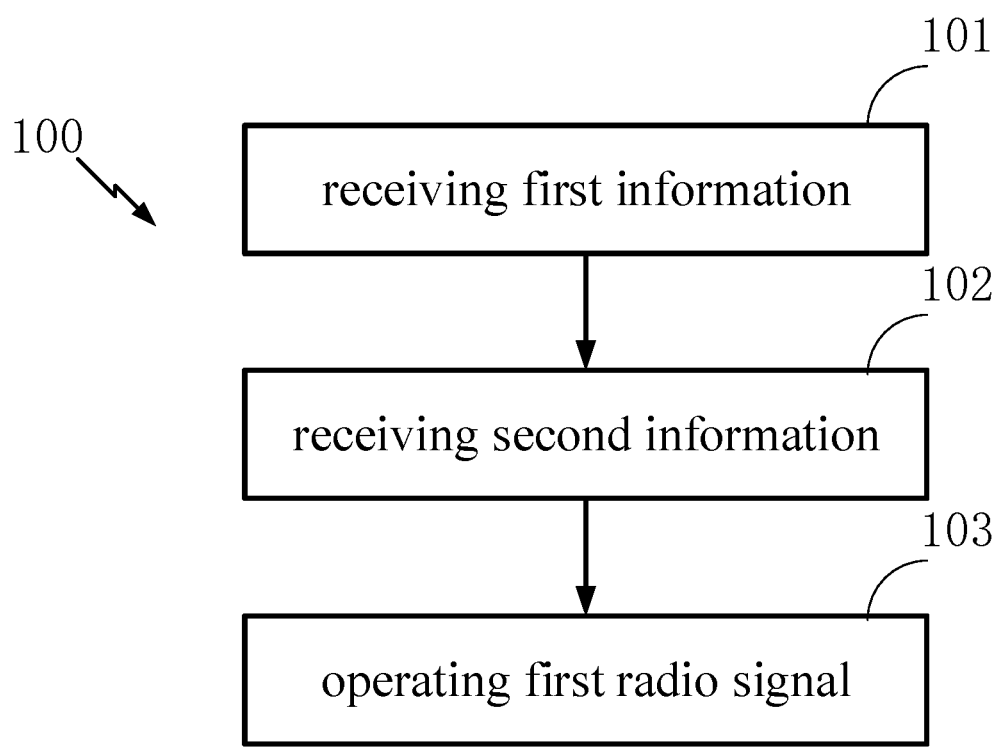
FIG. 1 is a flowchart of transmission of first information, second information and a first radio signal according to one embodiment of the present disclosure.

Embodiment 1 illustrates a flowchart of transmission of first information, second information and a first radio signal according to one embodiment of the present disclosure, as shown in FIG. 1. In FIG. 1, each block represents a step. In Embodiment 1, a UE in the present disclosure first receives first information, and then receives second information, and operates a first radio signal; wherein the first information comprises Q field(s), the Q field(s) corresponds(correspond) to Q target receiver(s) respectively, the UE is a target receiver out of the Q target receiver(s); a first field out of the Q field(s) corresponds to the UE, the first field is used to determine a first antenna port set, the first field is a field of the Q field(s); the first antenna port set comprises a positive integer number of antenna port(s), the second information is transmitted by antenna port(s) within the first antenna port set; the first information and the second information are both dynamically configured; the Q is a positive integer; the executing is transmitting, or the executing is receiving; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the first information is specific to a UE group; the UE group comprises one or more UEs.

In one embodiment, the phrase that the first information and the second information are both dynamically configured refers to: the first information is carried by a physical layer signaling, the second information is carried by a physical layer signaling.

In one embodiment, the phrase that the first information and the second information are both dynamically configured refers to: the first information is transmitted on a Physical Downlink Control Channel (PDCCH) or an enhanced PDCCH (ePDCCH), and the second information is transmitted on a PDCCH or an ePDCCH.

In one embodiment, the phrase that the first information and the second information are both dynamically configured refers to: the first information and the second information are Downlink Control Information (DCI) respectively.

In one embodiment, the operating is receiving, the first radio signal is transmitted on a downlink physical layer data channel (namely, a downlink channel that can carry physical layer data). In one subembodiment, the downlink physical layer data channel is a Physical Downlink Shared Channel (PDSCH). In one subembodiment, the downlink physical layer data channel is a short PDSCH (sPDSCH).

In one embodiment, the operating is transmitting, the first radio signal is transmitted on an uplink physical layer data channel (namely, an uplink channel that can carry physical layer data). In one subembodiment, the uplink physical layer data channel is a Physical Uplink Shared Channel (PUSCH). In one subembodiment, the uplink physical layer data channel is a short PUSCH (sPUSCH).

In one embodiment, the Q is 1.

In one embodiment, the target receiver is a terminal.

EMBODIMENT 2

Figure 2:
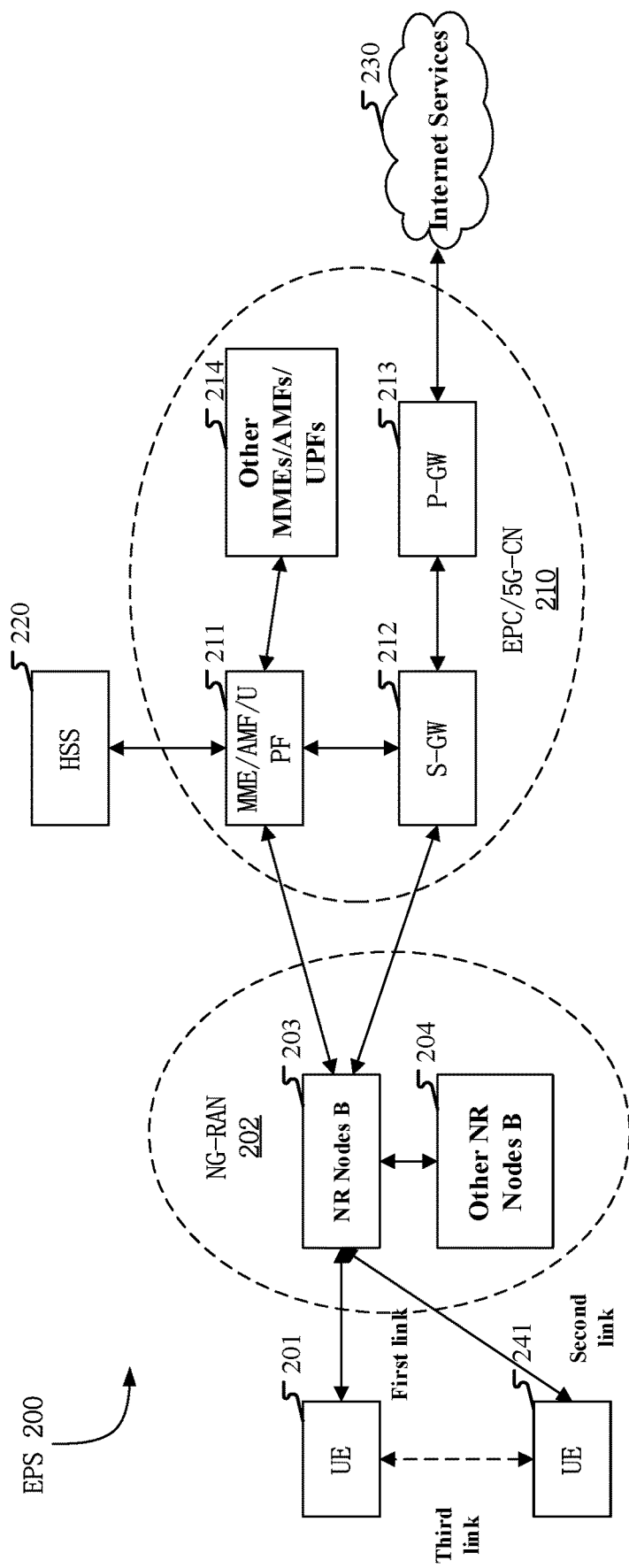
FIG. 2 is a schematic diagram illustrating a network architecture according to one embodiment of the present disclosure.

Embodiment 2 illustrates a schematic diagram illustrating a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNBs 204 via an Xn interface (for example, backhaul). The gNB 203 may be called a base station, a base transceiver station, a radio base station, a radio transceiver, a transceiver function, a Base Service Set (BBS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises an MME/AMF/UPF 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Streaming Services (PSSs).

In one embodiment, the UE 201 corresponds to the UE in the present disclosure.

In one embodiment, the gNB 203 corresponds to the base station in the present disclosure.

In one embodiment, the UE 201 supports multi-antenna transmission.

In one embodiment, the gNB 203 supports multi-antenna transmission.

EMBODIMENT 3

Figure 3:
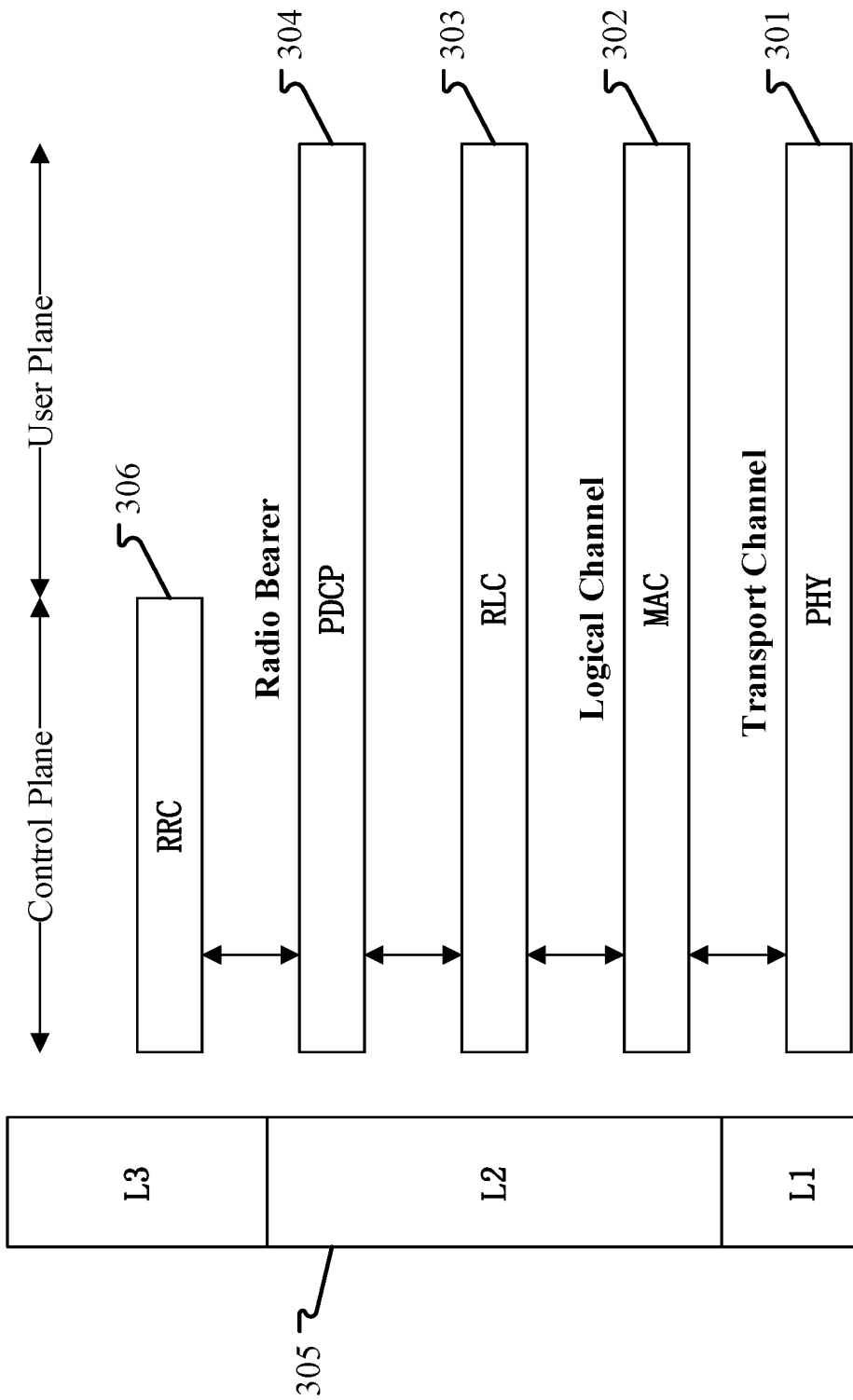
FIG. 3 is a schematic diagram illustrating a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between logical channels and transport channels. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the RRC 306.

In one embodiment, the second information in the present disclosure is generated by the RRC 306.

In one embodiment, the first information in the present disclosure is generated by the PHY 301.

In one embodiment, the second information in the present disclosure is generated by the PHY 301.

In one embodiment, the first radio signal is generated by the RRC 306.

In one embodiment, the first radio signal is generated by the MAC 302.

In one embodiment, the third information is generated by the RRC 306.

In one embodiment, the downlink RS is generated by the PHY 301.

In one embodiment, the second radio signal is generated by the RRC 306.

In one embodiment, the second radio signal is generated by the PHY 301.

EMBODIMENT 4

Figure 4:
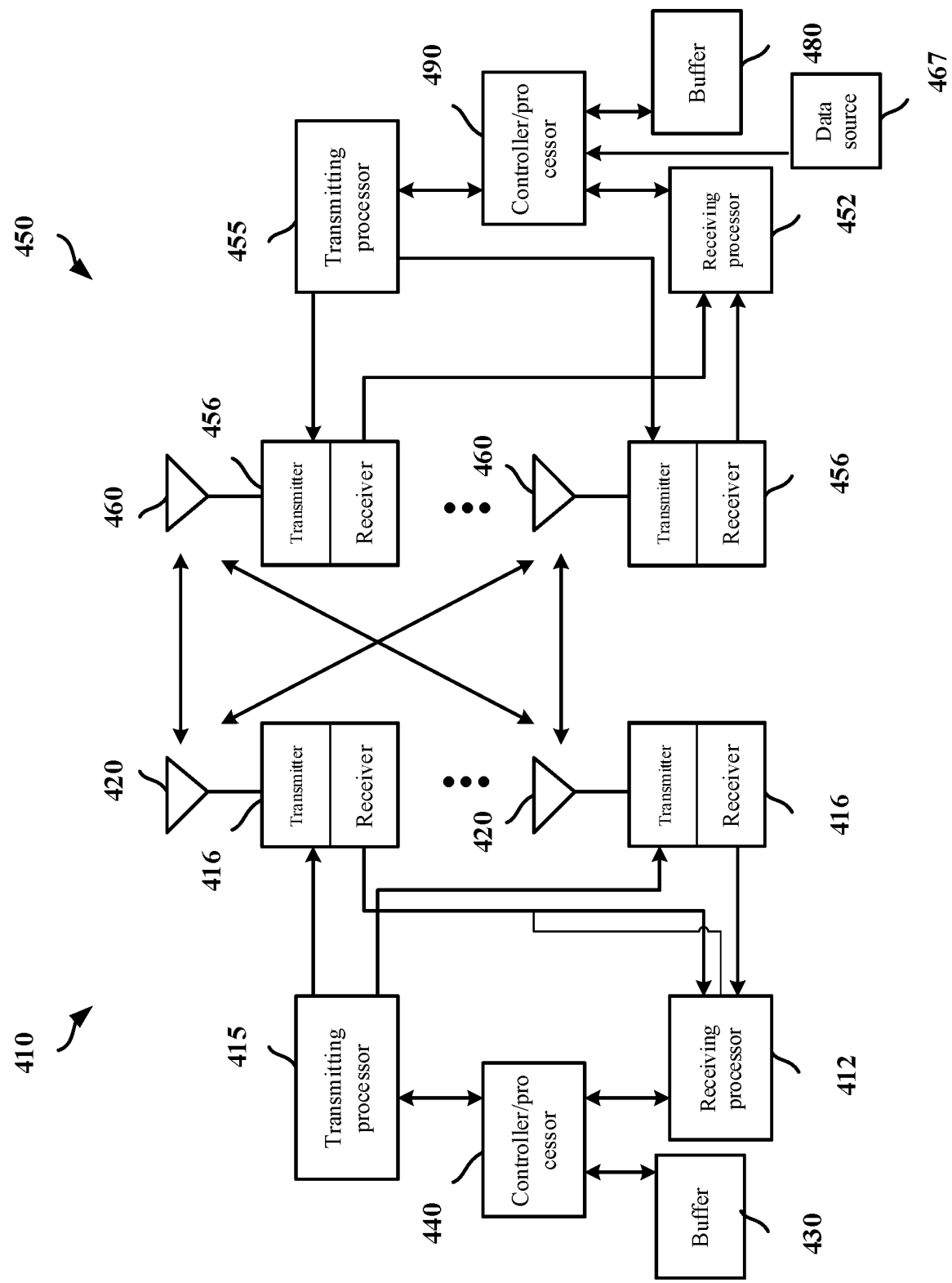
FIG. 4 is a schematic diagram of a base station and a UE according to one embodiment of the present disclosure.

Embodiment 4 illustrates a schematic diagram of a base station and a given UE according to the present disclosure, as shown in FIG. 4. FIG. 4 is a block diagram of a UE 450 and a gNB 410 that are in communication with each other in an access network.

The UE 450 comprises a controller/processor 490, a memory 480, a receiving processor 452, a transmitter/receiver 456, a transmitting processor 455 and a data source 467. The transmitter/receiver 456 comprises an antenna 460. The data source 467 provides a higher-layer packet to the controller/processor 490, the controller/processor 490 provides header compression and decompression, encryption and decryption, packet segmentation and reordering, and multiplexing and de-multiplexing between a logical channel and a transport channel, so as to implement the L2 protocol used for the user plane and the control plane. The higher-layer packet may comprise data or control information, such as a DL-SCH or UL-SCH. The transmitting processor performs various signal transmitting processing functions of L1 (that is, PHY), including encoding, interleaving, scrambling, modulation, power control/allocation, precoding, and generation of physical layer control signaling, etc. The receiving processor 452 performs various signal receiving processing functions of L1 (that is, PHY), including decoding, de-interleaving, descrambling, demodulation, de-precoding and extraction of physical layer control signaling, etc. The transmitter 456 is configured to convert a baseband signal provided by the transmitting processor 455 into a radio frequency signal and transmit the radio frequency signal via the antenna 460, the receiver 456 is configured to convert the radio frequency signal received via the antenna 460 into a baseband signal and provide the baseband signal to the receiving processor 452.

The base station 410 may comprise a controller/processor 440, a memory 430, a receiving processor 412, a transmitter/receiver 416 and a transmitting processor 415. The transmitter/receiver 416 comprises an antenna 420. A packet from a higher layer is provided to the controller/processor 440. The controller/processor 440 provides header compression and decompression, encryption and decryption, packet segmentation and reordering, multiplexing and de-multiplexing between a logical channel and a transport channel, to implement the L2 protocol used for the user plane and the control plane. The packet from a higher layer may comprise data or control information, for example, a DL-SCH or UL-SCH. The transmitting processor 415 performs various signal transmitting processing functions used for the L1 (that is, PHY), such as encoding, interleaving, scrambling, modulation, power control/allocation, precoding and generation of physical layer control signaling (i.e., PBCH, PDCCH, PHICH, PCFICH, a reference signal, etc.). The receiving processor 412 performs various signal receiving processing functions such as decoding, de-interleaving, descrambling, demodulation, de-precoding, and extraction of physical layer signaling. The transmitter 416 is configured to convert a baseband signal provided by the transmitting processor 415 into a radio frequency signal and provide the radio frequency signal via the antenna 420, the receiver 416 is configured to convert the radio frequency signal received via the antenna 420 into a baseband signal and provide the baseband signal to the receiving processor 412.

In Downlink (DL) transmission, higher-layer packets DL-SCH comprising a first radio signal and third information in the present disclosure is provided to the controller/processor 440. The controller/processor 440 implements functions of L2. In DL, the controller/processor 440 provides header compression, encryption, packet segmentation and reordering, and multiplexing between a logical channel and a transport channel, as well as radio resources allocation for the UE 450 based on various priorities. The controller/processor 440 is also in charge of HARQ operation, retransmission of a lost packet, and a signaling to the UE 450. The transmitting processor 415 performs signal processing functions used for the L1 (that is, PHY). The signal processing functions include encoding and interleaving so as to ensure Forward Error Correction (FEC) and the modulation of baseband signals corresponding to each modulation scheme (i.e., BPSK, QPSK) at the UE 450 side. The modulated signals are divided into parallel streams. Each of the parallel streams is mapped into corresponding multi-carrier subcarriers and/or multi-carrier symbols, which are then mapped from the transmitting processor 415 to the antenna 420 via the transmitter 416 and transmitted in the form of radio frequency signals. First information and second information in the present disclosure are mapped from the transmitting processor 415 to the antenna 420 via the transmitter 416 and transmitted in the form of radio frequency signals. At receiver side, each receiver 456 receives a radio frequency signal via a corresponding antenna 460. Each receiver 456 recovers baseband information modulated to a radio frequency carrier, and provides the baseband information to the receiving processor 452. The receiving processor 452 implements signal receiving processing functions used for the L1. The signal receiving processing functions include detection of first information and second information, and reception of physical layer signals carrying third information and a first radio signal in the present disclosure. Multi-carrier symbols of the multi-carrier symbol streams are used for demodulation corresponding to each modulation scheme (i.e., BPSK, QPSK), then the multi-carrier symbols are decoded and de-interleaved to recover data or control signal transmitted by the gNB 410 on a physical channel. The recovered data and control signal are later provided to the controller/processor 490. The controller/processor 490 performs functions of the L2. The controller/processor can be connected to the memory 480 that stores program codes and data. The memory 480 may be called a computer readable medium.

In Uplink (UL) transmission, the data source 467 provides a first radio signal of the present disclosure to the controller/processor 490. The data source 467 represents all protocol layers above the L2. The controller/processor 490 provides header compression, encryption, packet segmentation and reordering, and multiplexing between a logical channel and a transport channel based on radio resources allocation for the gNB 410, so as to implement the L2 protocols used for the user plane and the control plane. The controller/processor 490 is also responsible for HARQ operation, retransmission of a lost packet, and a signaling to the gNB 410. The transmitting processor 455 performs signal transmitting processing functions used for the L1 (that is, PHY). The signal transmitting processing functions include encoding and interleaving so as to ensure FEC and the modulation of baseband signals corresponding to each modulation scheme (i.e., BPSK, QPSK) at the UE 350 side. The modulated signals are divided into parallel streams. Each of the parallel streams is mapped into corresponding multi-carrier subcarriers and/or multi-carrier symbols, which are then mapped from the transmitting processor 455 to the antenna 460 via the transmitter 456 and transmitted in the form of radio frequency signals. A second radio signal in the present disclosure is generated by the transmitting processor 455, mapped from the transmitter 456 to the antenna 460, and transmitted by the antenna 460. The receiver 416 receives a radio frequency signal via a corresponding antenna 420. Each receiver 416 recovers baseband information modulated to a radio frequency carrier, and provides the baseband information to the receiving processor 412. The receiving processor 412 implements signal receiving processing functions for L1 (that is, PHY). The signal receiving processing functions include acquiring multi-carrier symbol streams, demodulating multi-carrier symbols of multi-carrier symbol streams corresponding to each modulation scheme (i.e., BPSK, QPSK), and then decoding and de-interleaving the demodulated multi-carrier symbols to recover original data and/or control signal transmitted by the UE 450 on a physical channel. The recovered data and/or control signal are/is then provided to the controller/processor 440. The controller/processor 440 implements functions of L2. The controller/processor can be connected to the memory 430 that stores program codes and data. The memory 430 may be called a computer readable medium.

In one embodiment, the UE 450 comprises at least one processor and at least one memory, the at least one memory comprises computer program codes; the at least one memory and the computer program codes are configured to be used in collaboration with the at least one processor. The UE 450 at least: receives first information; receives second information; and operates a first radio signal; wherein the first information comprises Q field(s), the Q field(s) corresponds (correspond) to Q target receiver(s) respectively, the UE is a target receiver out of the Q target receiver(s); a first field out of the Q field(s) corresponds to the UE, the first field is used to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer; the operating is receiving, or the operating is transmitting; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the UE 450 comprises a memory that stores a computer readable instruction program. The computer readable instruction program generates an action when executed by at least one processor. The action includes receiving first information; receiving second information; and operating a first radio signal; wherein the first information comprises Q field(s), the Q field(s) corresponds(correspond) to Q target receiver(s) respectively, the UE is a target receiver out of the Q target receiver(s); a first field out of the Q field(s) corresponds to the UE, the first field is used to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer; the operating is receiving, or the operating is transmitting; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the gNB 410 comprises at least one processor and at least one memory. The at least one memory comprises computer program codes; the at least one memory and the computer program codes are configured to be used in collaboration with the at least one processor. The gNB 410 at least: transmits first information; transmits second information; and executes a first radio signal; wherein the first information comprises Q field(s), the Q field(s) corresponds (correspond) to Q target receiver(s) respectively, a receiver of the second information is a target receiver out of the Q target receiver(s); a first field out of the Q field(s) corresponds to the receiver of the second information, the first field is used to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer; the executing is transmitting, or the executing is receiving; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the gNB 410 comprises a memory that stores a computer readable instruction program, the computer readable instruction program generates an action when executed by at least one processor. The action includes: transmitting first information; transmitting second information; and executing a first radio signal; wherein the first information comprises Q field(s), the Q field(s) corresponds(correspond) to Q target receiver(s) respectively, a receiver of the second information is a target receiver out of the Q target receiver(s); a first field out of the Q field(s) corresponds to the receiver of the second information, the first field is used to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer; the executing is transmitting, or the executing is receiving; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s).

In one embodiment, the UE 450 corresponds to the UE in the present disclosure.

In one embodiment, the gNB 410 corresponds to the base station in the present disclosure.

In one embodiment, the receiver 456 (comprising the antenna 460) and the receiving processor 452 are used for receiving first information in the present disclosure.

In one embodiment, the receiver 456 (comprising the antenna 460) and the receiving processor 452 are used for receiving second information in the present disclosure.

In one embodiment, the receiver 456 (comprising the antenna 460), the receiving processor 452 and the controller/processor 490 are used for receiving third information in the present disclosure.

In one embodiment, the receiver 456 (comprising the antenna 460), the transmitting processor 455 and the controller/processor 490 are used for transmitting a first radio signal in the present disclosure.

In one embodiment, the receiver 456 (comprising the antenna 460), the receiving processor 452 and the controller/processor 490 are used for receiving a first radio signal in the present disclosure.

In one embodiment, the receiver 456 (comprising the antenna 460) and the transmitting processor 455 are used for transmitting a second radio signal in the present disclosure.

In one embodiment, the receiver 456 (comprising the antenna 460) and the receiving processor 452 are used for receiving downlink RS in the present disclosure.

In one embodiment, the transmitter 416 (comprising the antenna 420) and the transmitting processor 415 are used for transmitting first information in the present disclosure.

In one embodiment, the transmitter 416 (comprising the antenna 420) and the transmitting processor 415 are used for transmitting second information in the present disclosure.

In one embodiment, the transmitter 416 (comprising the antenna 420), the transmitting processor 415 and the controller/processor 440 are used for transmitting third information in the present disclosure.

In one embodiment, the transmitter 416 (comprising the antenna 420), the transmitting processor 415 and the controller/processor 440 are used for transmitting a first radio signal in the present disclosure.

In one embodiment, the receiver 416 (comprising the antenna 420), the receiving processor 412 and the controller/processor 440 are used for receiving a first radio signal in the present disclosure.

In one embodiment, the receiver 416 (comprising the antenna 420) and the receiving processor 412 are used for receiving a second radio signal in the present disclosure.

In one embodiment, the transmitter 416 (comprising the antenna 420) and the transmitting processor 415 are used for transmitting downlink RS in the present disclosure.

EMBODIMENT 5

Figure 5:
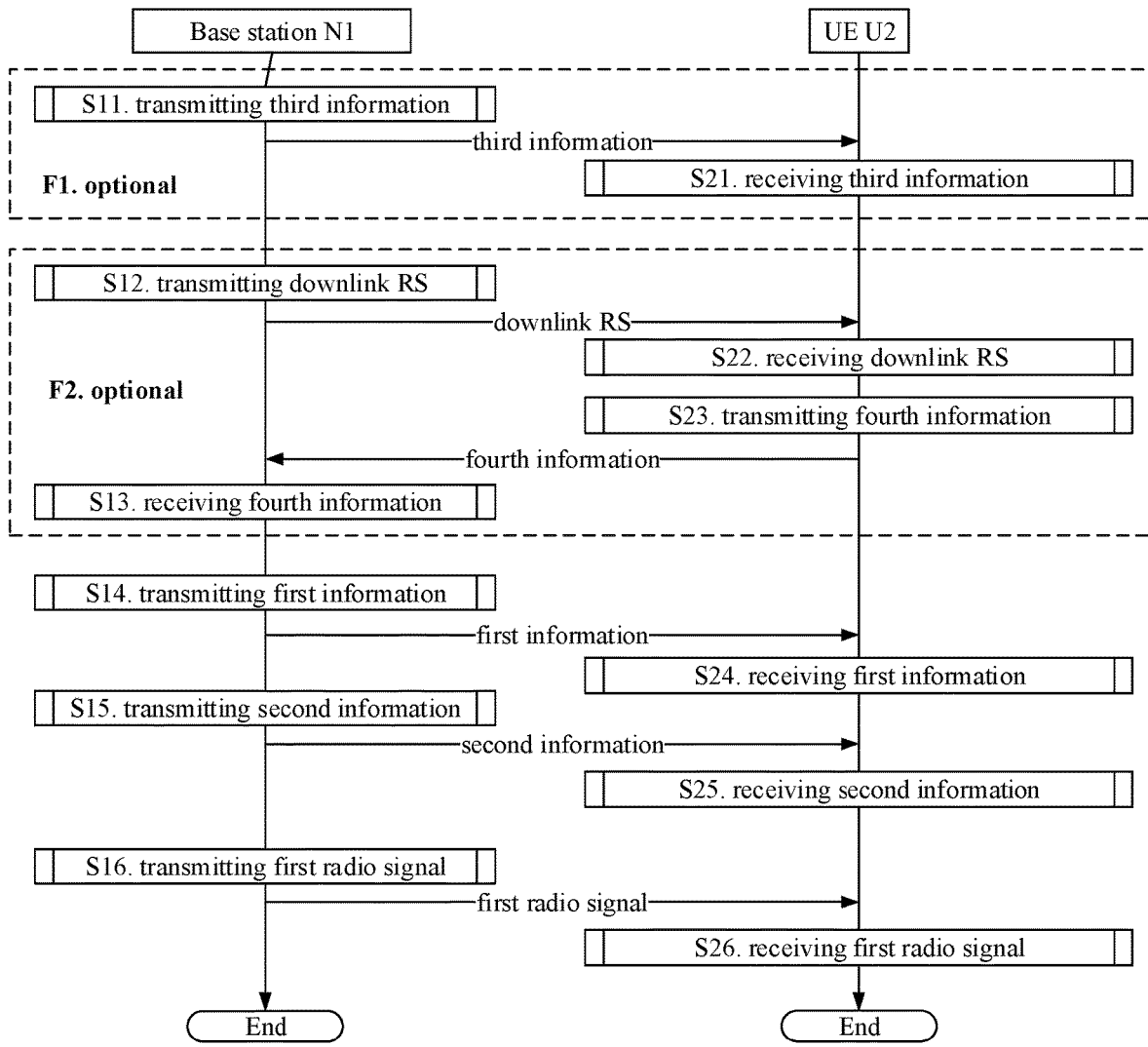
FIG. 5 is a flowchart of scheduling downlink transmission according to one embodiment of the present disclosure.

Embodiment 5 illustrates a flowchart of scheduling downlink transmission, as shown in FIG. 5. In FIG. 5, the base station N1 is a maintenance base station for a serving cell of the UE U2. In FIG. 5, steps in box F1 and box F2 are optional.

The base station N1 transmits third information in step S11; transmits downlink RS in step S12; receives fourth information in step S13; transmits first information in step S14; transmits second information in step S15; and transmits a first radio signal in step S16.

The UE U2 receives the third information in step S21; receives downlink RS in step S22; transmits fourth information in step S23; receives first information in step S24; receives second information in step S25; and receives a first radio signal in step S26.

In Embodiment 5, the first information comprises Q field(s), the Q field(s) corresponds(correspond) to Q target receiver(s) respectively, the UE U2 is a target receiver out of the Q target receiver(s); a first field out of the Q field(s) corresponds to the UE U2, the first field is used by the UE U2 to determine a first antenna port set, the first field is a field of the Q field(s); the first antenna port set comprises a positive integer number of antenna port(s), the second information is transmitted by an antenna port within the first antenna port set; the first information and the second information are both dynamically configured; the Q is a positive integer. The second information is used to determine scheduling information of the first radio signal, the scheduling information comprises at least one of time-frequency resources occupied, a transmitting antenna port set, a power control parameter, MCS, RV, NDI, or a HARQ Process Number. The transmitting antenna port set comprises a positive integer number of antenna port(s). The third information is used by the UE U2 to determine at least one of a position of the first field in the Q field(s), or a first ID. The first ID is an integer, the first ID is used to determine at least one of CRC bits for the first information, scrambling codes for the first information, or a scrambling code sequence for the first information. P1 antenna port sets are respectively used for P1 transmissions of the first information, the P1 is a positive integer greater than 1, each of the P1 antenna port sets comprises a positive integer number of antenna port(s). The downlink RS is transmitted by P2 antenna port sets. The P2 is a positive integer greater than or equal to the P1, each of the P2 antenna port sets comprises a positive integer of antenna port(s). The P1 antenna port sets are a subset of the P2 antenna port sets. The fourth information is used by the base station N1 to determine at least one of the first antenna port set or the P1 antenna port sets.

In one embodiment, the first radio signal carries a positive integer number of transport block(s).

In one embodiment, a transmission channel corresponding to the first radio signal is a Downlink Shared Channel (DL-SCH).

In one embodiment, the Q is greater than 1.

In one embodiment, the P1 is configurable.

In one embodiment, at least two antenna port sets out of the P1 antenna port sets comprise difference numbers of antenna port(s).

In one embodiment, antenna port(s) in one of the antenna port sets correspond to the same analog beamforming vector.

In one embodiment, the first information is carried by a feature sequence or a DCI.

In one embodiment, the second information is Downlink Grant DCI.

In one embodiment, the first ID is specific to a terminal group, and the UE U2 is a terminal of the terminal group. In one embodiment, the terminal group allocated with the first ID correspond to a same direction of transmitting beam.

EMBODIMENT 6

Figure 6:
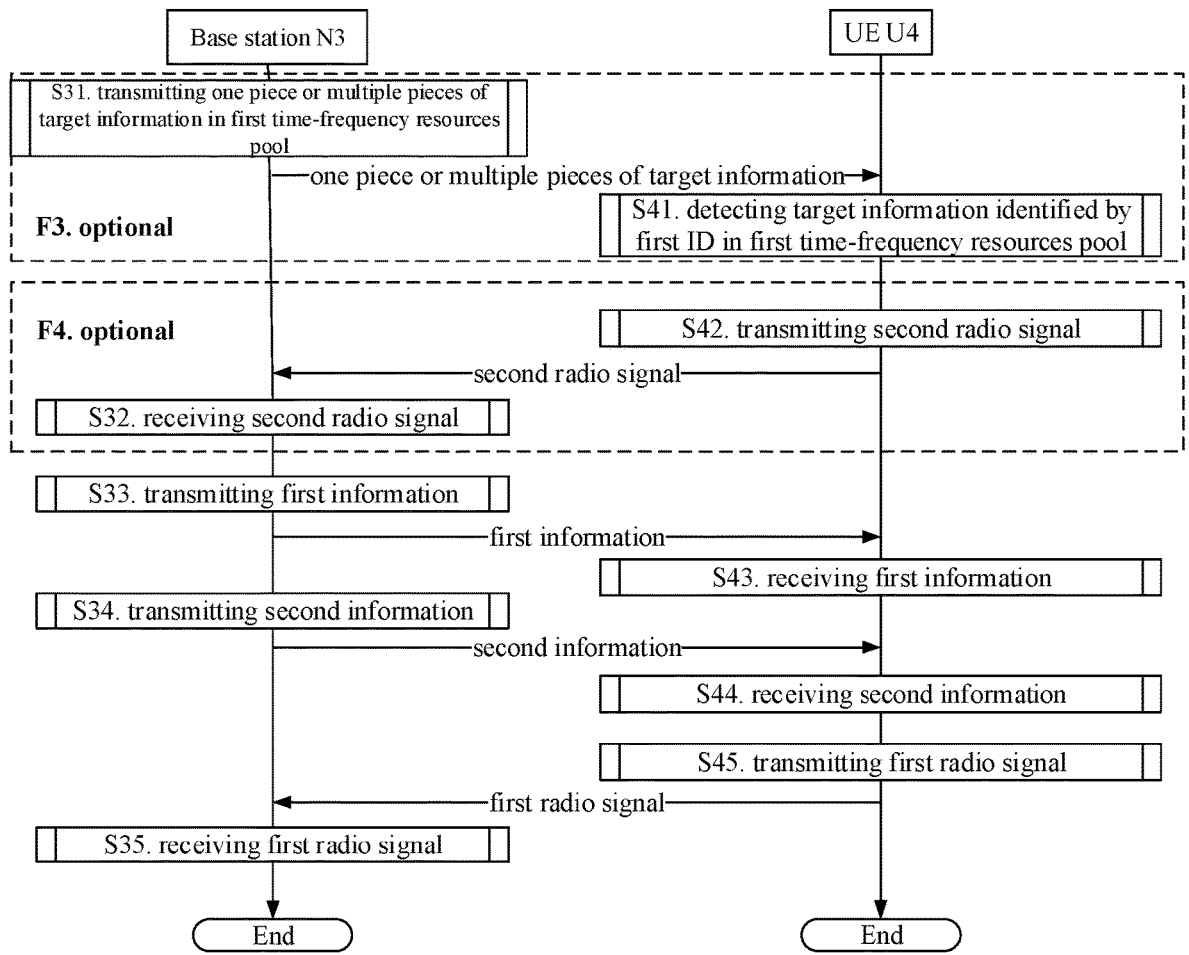
FIG. 6 is a flowchart of scheduling uplink transmission according to one embodiment of the present disclosure.

Embodiment 6 illustrates a flowchart of scheduling uplink transmission, as shown in FIG. 6. In FIG. 6, the base station N3 is a maintenance base station for a serving cell of the UE U4. In FIG. 6, steps in box F3 and box F4 are optional respectively.

The base station N3 transmits one or multiple pieces of target information in a first time-frequency resource pool in step S31; receives a second radio signal in step S32; transmits first information in step S33; transmits second information in step S34; and receives a first radio signal in step S35.

The UE U4 detects target information in a first time-frequency resource pool in step S41; transmits a second radio signal in step S42; receives first information in step S43; receives second information in step S44; and transmits a first radio signal in S45.

In Embodiment 6, the first ID is used by the UE U4 to determine at least one of CRC bits for the target information, scrambling codes for the target information or a scrambling code sequence for the target information. The first information is the target information which is latest detected prior to the second information within the first time-frequency resource pool. The first ID is an integer. The second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1.

In one embodiment, the first ID is used by the UE U4 to determine time-frequency resources occupied by the target information. In one embodiment, the time-frequency resources occupied by the target information belongs to Common Search Space (CSS).

In one embodiment, the antenna port(s) is(are) formed by superposition of multiple antennas multiplied by respective coefficients, the respective coefficients constitute corresponding antenna virtualization vectors.

In one embodiment, a transmission channel corresponding to the first radio signal is an Uplink Share Channel (UL-SCH).

In one embodiment, the second information is Uplink Grant DCI.

EMBODIMENT 7

Figure 7:
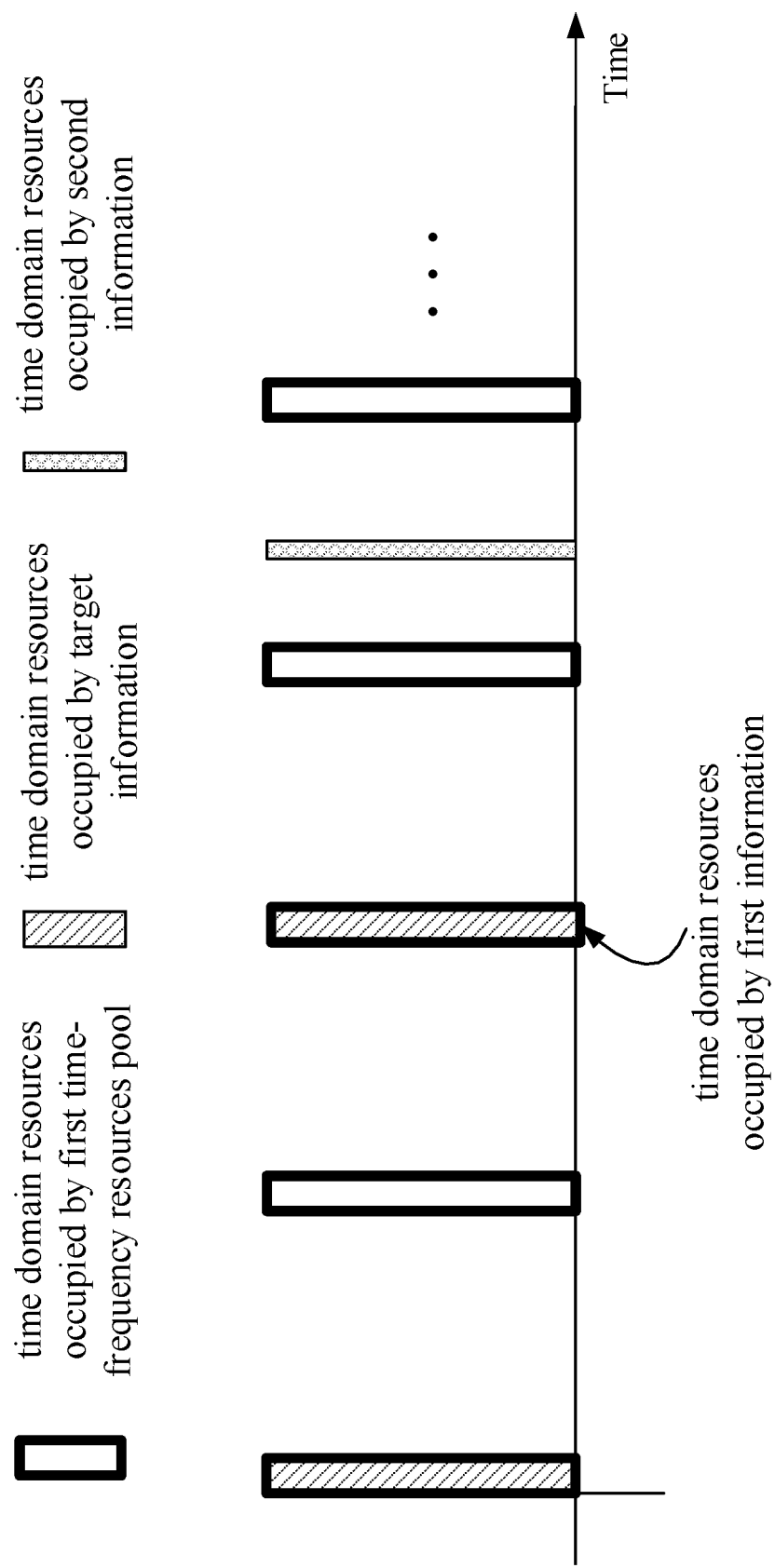
FIG. 7 is a timing diagram of first information and second information according to one embodiment of the present disclosure.

Embodiment 7 illustrates a timing diagram of first information and second information, as shown in FIG. 7. In FIG. 7, the square marked by thick line box represents resources occupied by a first time-frequency resource pool in time domain, the square filled with oblique lines represents time domain resources occupied by target information, the square filled with cross lines represents time domain resources occupied by second information.

In Embodiment 7, time-frequency resources occupied by the first information belongs to the first time-frequency resource pool. Time domain resources occupied by the first information is earlier than time domain resources occupied by the second information, and the UE does not receive the target information between the first information and the second information.

In one embodiment, before demodulating a given piece of the target information, the UE does not know time domain resources occupied by the given piece of the target information.

In one embodiment, the base station only transmits the target information when necessary, thus reducing redundant overhead of the target information and improving transmission efficiency.

In one embodiment, time domain resources occupied by the first information are greater than that occupied by the second information.

In one embodiment, P1 antenna port sets are respectively used for P1 transmissions of the first information, any two transmissions of the P1 transmissions occupy equal length of time. The P1 is a positive integer greater than 1.

In one embodiment, the first information is UE-specific. Embodiment 7 significantly reduces radio resources required by the first information, therefore the first information specific to the UE will not occupy excessive radio resources.

In one embodiment, the first time-frequency resource pool occupies an entire system bandwidth.

In one embodiment, the first time-frequency resource pool occupies part of the entire system bandwidth.

EMBODIMENT 8

Figure 8:
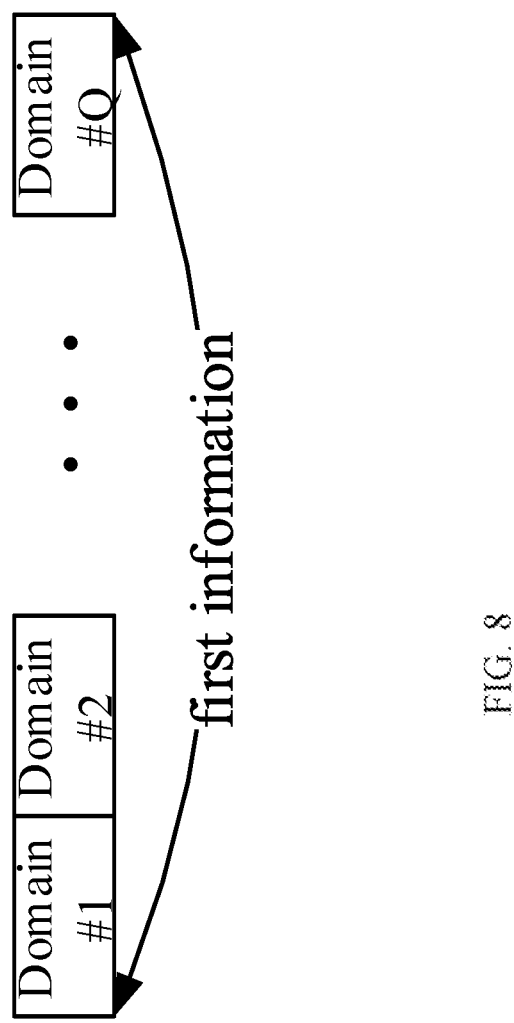
FIG. 8 is a schematic diagram of first information according to one embodiment of the present disclosure.

Embodiment 8 illustrates a schematic diagram of first information, as shown in FIG. 8.

In Embodiment 8, the first information comprises Q fields, index values for which are 1, 2, . . . , and Q, respectively. The Q fields correspond to Q target receivers respectively. For a given target receiver, a position (that is, field index value) of its corresponding field in the Q fields is configured by the third information in the present disclosure.

In one embodiment, the first information is common to a cell.

In one embodiment, the first information is specific to a terminal group. The above subembodiment can further reduce redundant overhead of the first information, namely, the base station only transmits the first information when there is at least one terminal whose information needs updating in the terminal group.

In one embodiment, the first information is UE-specific.

EMBODIMENT 9

Figure 9:
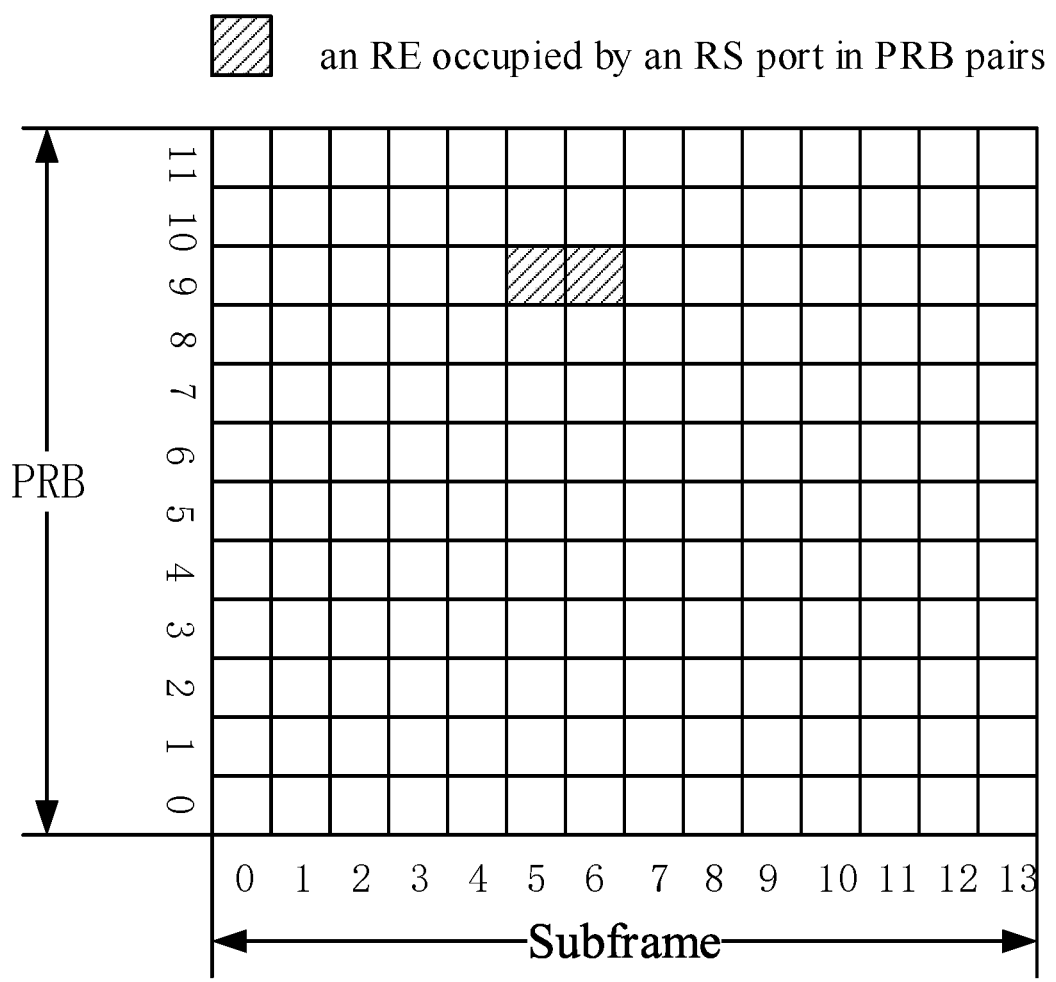
FIG. 9 is a schematic diagram illustrating time-frequency resources occupied by an RS port of a downlink RS in a PRB according to one embodiment of the present disclosure.

Embodiment 9 illustrates a schematic diagram illustrating time-frequency resources occupied by an RS port of a downlink RS on a PRB, as shown in FIG. 9. In FIG. 9, the square marked by oblique lines represents a Resource Element (RE) occupied by the RS port in a PRB.

In Embodiment 9, the downlink RS in the present disclosure comprises a positive integer number of RS port(s), one of the RS port(s) is transmitted by an antenna port, at least one of time domain resources, frequency domain resources or code domain resources occupied by RS ports transmitted by different antenna ports are orthogonal.

In one embodiment, time-frequency resources occupied by the RS port in a PRB is time-frequency resources occupied by a downlink Demodulation Reference Signal (DMRS).

EMBODIMENT 10

Figure 10:
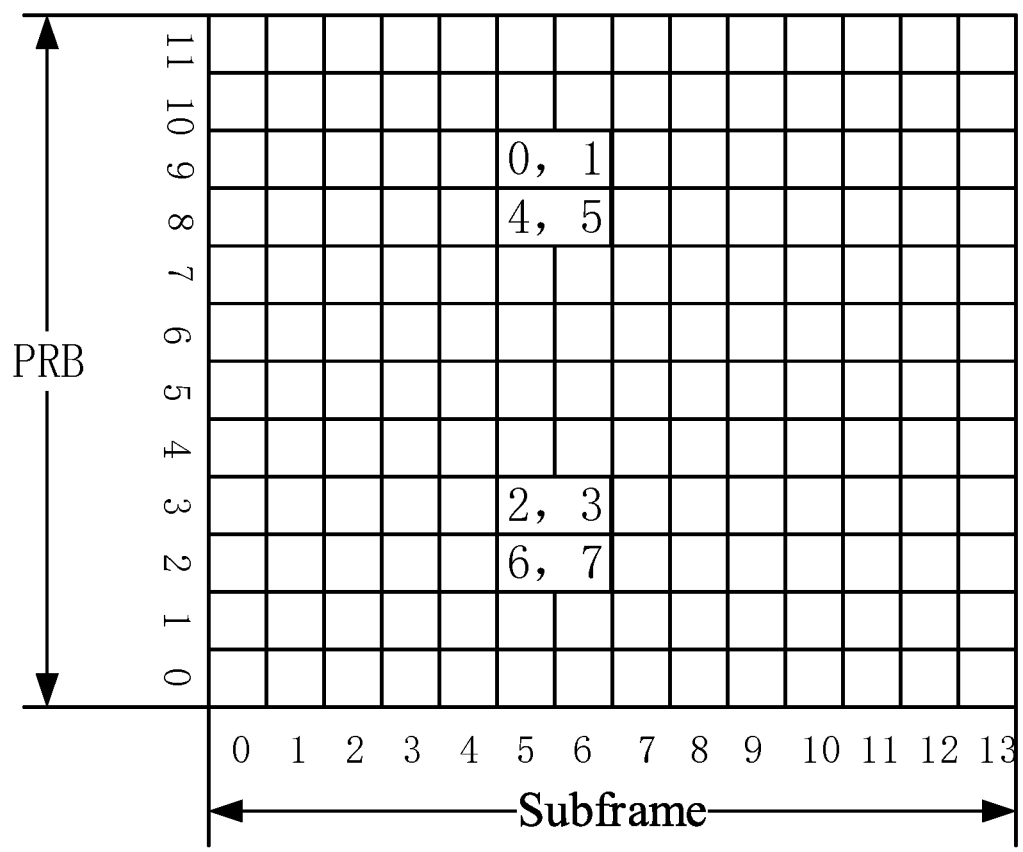
FIG. 10 is a schematic diagram illustrating time-frequency resources occupied by an RS port of a downlink RS in a PRB according to another embodiment of the present disclosure.

Embodiment 10 illustrates a schematic diagram illustrating time-frequency resources occupied by an RS port of a downlink RS in a PRB, as shown in FIG. 10. In FIG. 10, a square filled represents a Resource Element (RE) occupied by the RS port corresponding to an index number in a PRB.

In Embodiment 10, the downlink RS in the present disclosure comprises a positive integer of RS ports, one of the RS ports is transmitted by an antenna port, at least one of time domain resources, frequency domain resources or code domain resources occupied by RS ports transmitted by different antenna ports are orthogonal.

In Embodiment 10, time-frequency resources occupied by the RS port in a PRB is time-frequency resources occupied by a CSI-RS port.

EMBODIMENT 11

Figure 11:
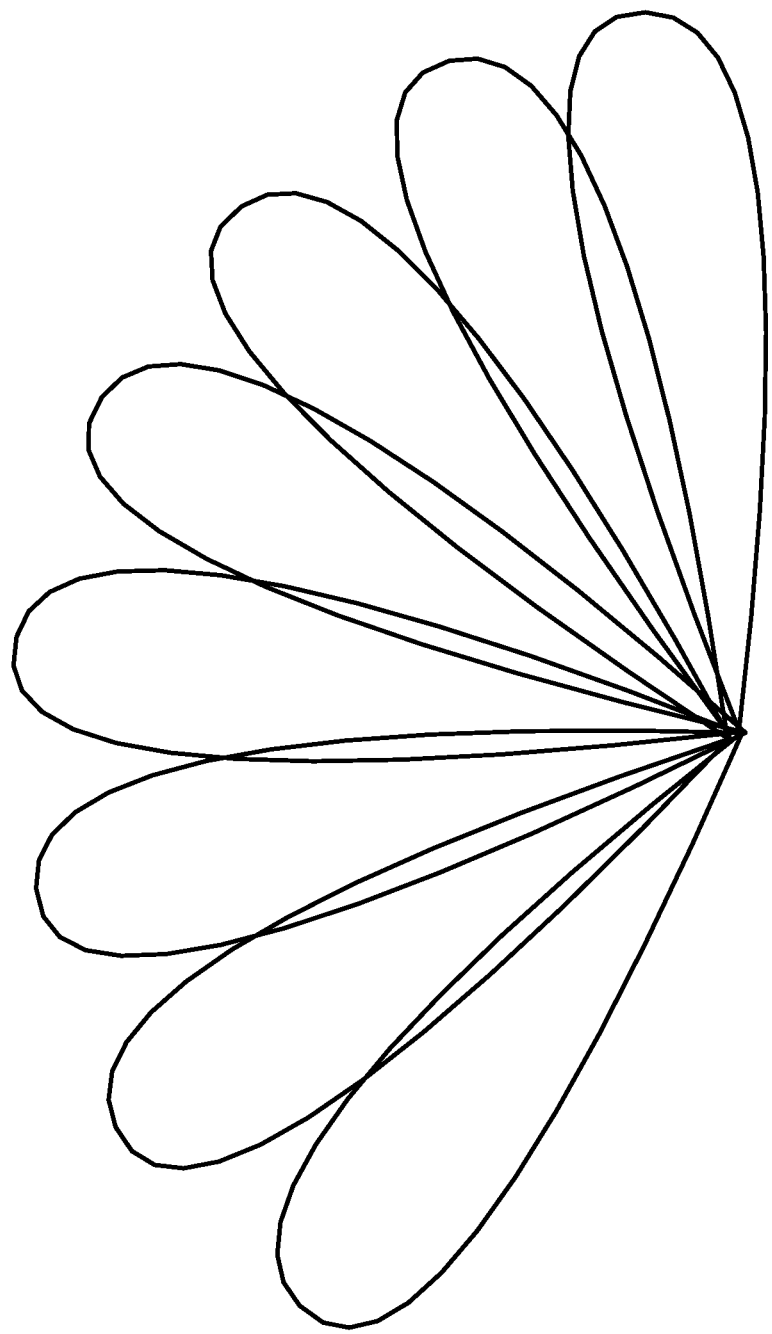
FIG. 11 is a schematic diagram of multiple beam directions according to one embodiment of the present disclosure.

Embodiment 11 illustrates a schematic diagram of multiple beam directions, as shown in FIG. 11.

In Embodiment 11, a transmitter or a receiver generates multiple transmitting beams or receiving beams through beamforming.

In one embodiment, for a transmitter, a beam direction in FIG. 11 corresponds to an analog beamforming direction (used for signal transmission) of all antenna ports in an antenna port set, multiple antennas of the antenna port set correspond to respective digital beamforming directions.

In one embodiment, for a receiver, a beam direction in FIG. 11 corresponds to an analog beamforming direction (used for signal reception) of all antenna ports in an antenna port set, multiple antennas of the antenna port set correspond to respective digital beamforming directions.

In one embodiment, the P1 in the present disclosure is 8, analog beamforming of the P1 antenna port sets in the present disclosure respectively correspond to 8 beam directions in FIG. 11.

In one embodiment, the P2 in the present disclosure is 8, analog beamforming of the P2 antenna port sets in the present disclosure respectively correspond to 8 beam directions in FIG. 11.

In one embodiment, the R2 in the present disclosure is 8, beamforming of the R2 antenna port sets in the present disclosure respectively correspond to 8 beam directions in FIG. 11.

In one embodiment,

EMBODIMENT 12

Figure 12:
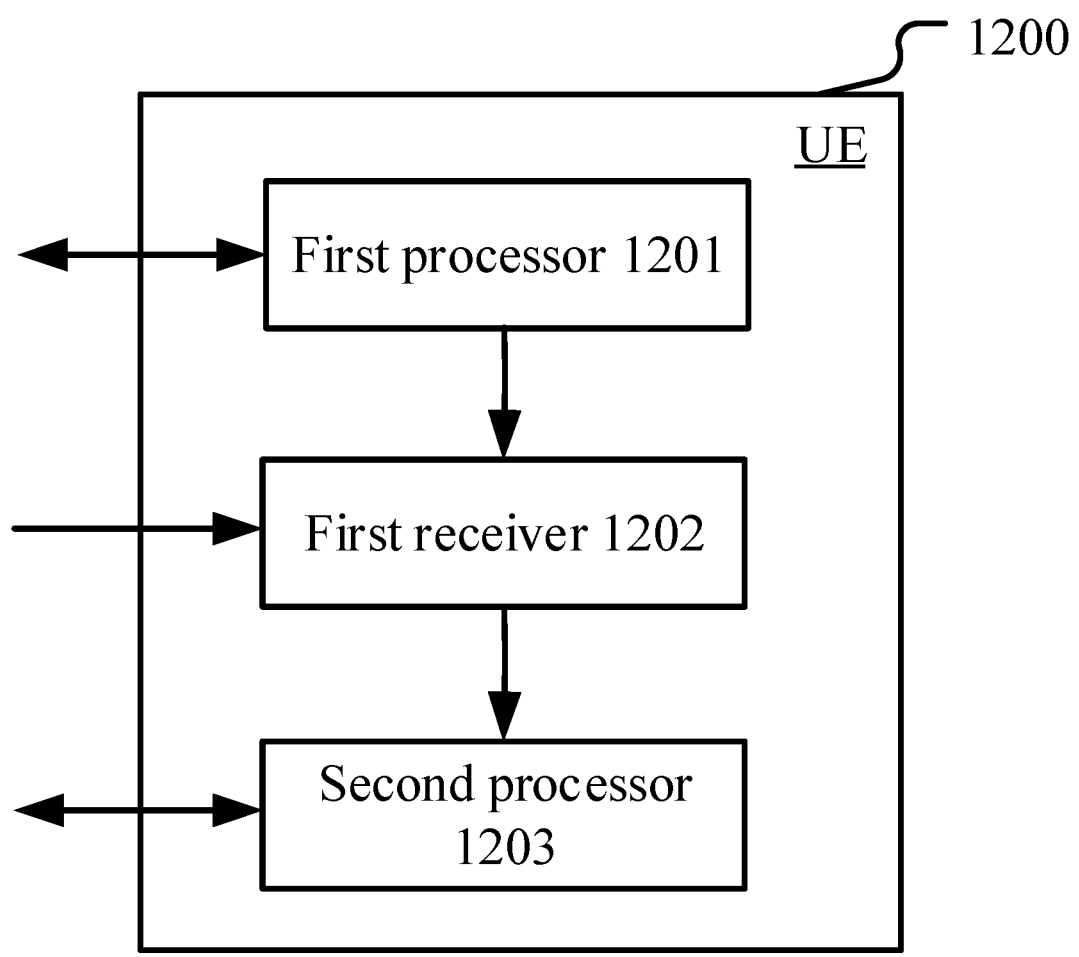
FIG. 12 is a structure block diagram illustrating a processing device in a UE according to one aspect of the present disclosure.

Embodiment 12 illustrates a structure block diagram illustrating a processing device in a UE, as shown in FIG. 12.

In FIG. 12, a UE 1200 comprises a first processor 1201, a first receiver 1202 and a second processor 1203. The first processor 1202 comprises the transmitter/receiver 456 (comprising the antenna 460), the transmitting processor 455 and the receiving processor 452 in FIG. 4 of the present disclosure; the first receiver 1202 comprises the transmitter/receiver 456 (comprising the antenna 460), the receiving processor 452 and the controller/processor 490 in FIG. 4 of the present disclosure; the second processor 1203 comprises the transmitter/receiver 456 (comprising the antenna 460), the transmitting processor 455, the receiving processor 452 and the controller/processor 490 in FIG. 4 of the present disclosure.

The first processor 1201 receives first information; the first receiver 1202 receives second information; the second processor 1203 receives or transmits a first radio signal.

In Embodiment 12, the first information comprises Q field(s), the Q field(s) corresponds (correspond) to Q target receiver(s) respectively, the UE is a target receiver out of the Q target receiver(s). A first field out of the Q field(s) corresponds to the UE, the first field is used to determine a first antenna port set, the first field is a field of the Q field(s). The first antenna port set comprises a positive integer number of antenna port(s), the second information is transmitted by an antenna port within the first antenna port set. The first information and the second information are both dynamically configured. The Q is a positive integer. The second information is used to determine scheduling information of the first radio signal, the scheduling information comprises at least one of time-frequency resources occupied, a transmitting antenna port set, a power control parameter, MCS, RV, NDI, or a HARQ Process Number. The transmitting antenna port set comprises a positive integer number of antenna port(s).

In one embodiment, the Q is greater than 1, the first information is DCI specific to a terminal group.

In one embodiment, the second processor 1203 is used to receive a first radio signal, the second information is Downlink Grant DCI.

In one embodiment, the second processor 1203 is used to transmit a first radio signal, the second information is Uplink Grant DCI.

EMBODIMENT 13

Figure 13:
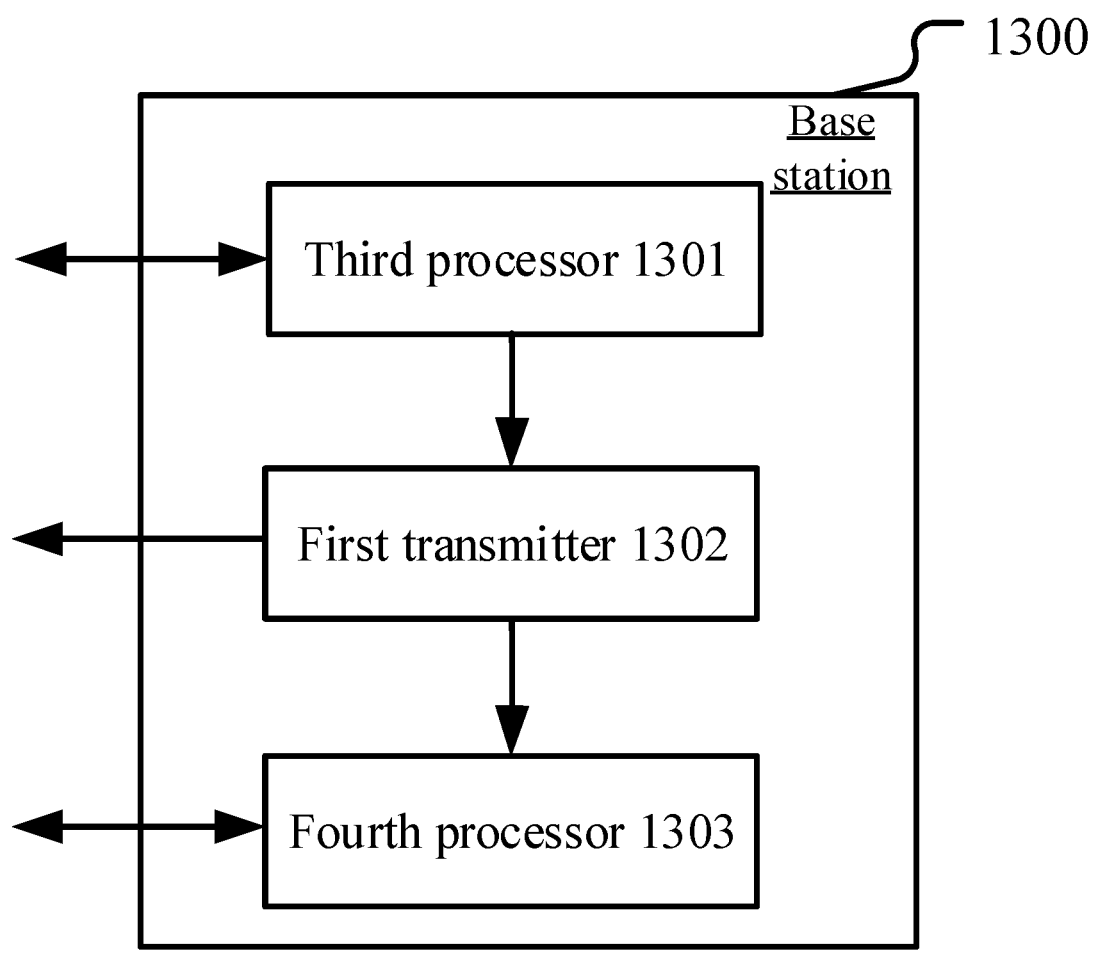
FIG. 13 is a structure block diagram illustrating a processing device in a base station according to one aspect of the present disclosure.

Embodiment 13 illustrates a structure block diagram illustrating a processing device in a base station, as shown in FIG. 13.

In FIG. 13, a base station 1300 comprises a third processor 1301, a first transmitter 1302 and a fourth processor 1303. The third processor 1301 comprises the transmitter/receiver 416 (comprising the antenna 420), the transmitting processor 415 and the receiving processor 412 in FIG. 4 of the present disclosure; the first transmitter 1302 comprises the transmitter/receiver 416 (comprising the antenna 420), the transmitting processor 415 and the controller/processor 440 in FIG. 4 of the present disclosure; the fourth processor 1303 comprises the transmitter/receiver 416 (comprising the antenna 420), the transmitting processor 415, the receiving processor 412 and the controller/processor 440.

The third processor 1301 transmits first information; the first transmitter 1302 transmits second information; the fourth processor 1303 transmits or receives a first radio signal.

In Embodiment 13, the first information comprises Q field(s), the Q field(s) corresponds(correspond) to Q target receiver(s) respectively, a receiver of the second information is a target receiver out of the Q target receiver(s). A first field out of the Q field(s) corresponds to the receiver of the second information, the first field is used to determine a first antenna port set, the first field is a field of the Q field(s). The first antenna port set comprises a positive integer number of antenna port(s), the second information is transmitted by an antenna port within the first antenna port set. The first information and the second information are both dynamically configured. The Q is a positive integer. The second information is used to determine scheduling information of the first radio signal, the transmission antenna port set comprises a positive integer number of antenna port(s).

In one embodiment, the scheduling information comprises at least one of time-frequency resources occupied, a transmitting antenna port set, a power control parameter, MCS, RV, NDI, or a HARQ Process Number.

In one embodiment, the scheduling information comprise a power control parameter.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but is not limited to mobile phones, tablet computers, notebooks, network cards, NB-IOT terminals, enhanced MTC (eMTC) terminals, and other radio communication equipment. The base station or system equipment in the present disclosure includes but is not limited to macro-cellular base stations, micro-cellular base stations, home base stations, relay base stations, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for dynamic scheduling, comprising:
   receiving first information from a base station;
   receiving second information from the base station; and operating a first radio signal;
   wherein the first information comprises Q field(s), each field of the Q field(s) corresponds to a respective target receiver of Q target receiver(s), the UE is a target receiver out of the Q target receiver(s); a first field out of the Q field(s) corresponds to the UE, the first field is used to determine a first antenna port set, the first field is one of the Q field(s); the first antenna port set comprises a positive integer number of antenna port(s), the second information is transmitted by an antenna port of the base station within the first antenna port set; the first information and the second information are both dynamically configured; wherein Q is a positive integer; the operating is receiving from the base station, or the operating is transmitting to the base station; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s); the first information and the second information are Downlink Control Information (DCI) respectively.

2. The method according to claim 1, comprising:
   receiving third information from the base station;
   wherein the third information is used to determine at least one of a position of the first field in the Q field(s), or a first ID; the first ID is an integer, the first ID is used to determine at least one of CRC bits for the first information, scrambling codes for the first information, or a scrambling code sequence for the first information;
   or P1 antenna port sets are respectively used for P1 transmissions of the first information, the P1 is a positive integer greater than 1, each of the P1 antenna port sets comprises a positive integer number of antenna port(s).

3. The method according to claim 2, comprising:
   detecting target information identified by the first ID in a first time-frequency resource pool;
   wherein the first ID is used to determine at least one of CRC bits for the target information, scrambling codes for the target information, or a scrambling code sequence for the target information; the first information is the target information which is latest detected prior to the second information within the first time-frequency resource pool; the first ID is an integer;
   or further comprising:
   receiving a downlink RS from the base station, the downlink RS is transmitted by P2 antenna port sets;
   wherein the P2 is a positive integer greater than or equal to the P1, each of the P2 antenna port sets comprises a positive integer number of antenna port(s); the P1 port sets are a subset of the P2 antenna port sets.

4. The method according to claim 1, wherein the first field is further used to determine a first vector group, the first vector group comprises R1 target vector(s), the R1 target vector(s) is(are) used for reception beamforming for the second information; the R1 is a positive integer;
   or further comprising:
   transmitting fourth information to the base station;
   wherein the fourth information is used to determine at least one of the first antenna port set, or the P1 antenna port sets.

5. The method according to claim 4, comprising:
   transmitting a second radio signal to the base station;
   wherein the second radio signal is transmitted by R2 antenna port(s), the R2 antenna port(s) corresponds (correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1.

6. A method in a base station for dynamic scheduling, comprising:
   transmitting first information to Q target receiver(s);
   transmitting second information to a user equipment (UE); and
   executing a first radio signal;
   wherein the first information comprises Q field(s)each field of the Q field(s) corresponds to a respective target receiver of Q target receiver(s), a receiver for the second information is a target receiver out of the Q target receiver(s); a first field out of the Q field(s) corresponds to the receiver for the second information, the first field is used to determine a first antenna port set, the first field is one of the Q field(s); the first antenna port set comprises a positive integer number of antenna port(s), the second information is transmitted by an antenna port of the base station within the first antenna port set; the first information and the second information are both dynamically configured; wherein Q is a positive integer; the executing is transmitting to the UE, or the executing is receiving from the UE; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s); the first information and the second information are Downlink Control Information (DCI) respectively.

7. The method according to claim 6, further comprising:
   transmitting third information to the UE;
   wherein the third information is used to determine at least one of a position of the first field in the Q field(s), or a first ID; the first ID is an integer, the first ID is used to determine at least one of CRC bits for the first information, scrambling codes for the first information, or a scrambling code sequence for the first information;
   or P1 antenna port sets are respectively used for P1 transmissions of the first information, the P1 is a positive integer greater than 1, each of the P1 antenna port sets comprises a positive integer number of antenna port(s).

8. The method according to claim 7, comprising:
transmitting one piece or multiple pieces of target information in a first time-frequency resource pool;
wherein the first ID is used to determine at least one of CRC bits for the target information, scrambling codes for the target information, or a scrambling code sequence for the target information; the first information is the target information which is latest transmitted prior to the second information within the first time-frequency resource pool; the first ID is an integer;
or further comprising:
transmitting a downlink RS to the Q target receiver(s), the downlink RS is transmitted by P2 antenna port sets;
wherein the P2 is a positive integer greater than or equal to the P1, each of the P2 antenna port sets comprises a positive integer number of antenna port(s); the P1 antenna port sets are a subset of the P2 antenna port sets.

9. The method according to claim 6, wherein the first field is used to determine a first vector group, the first vector group comprises R1 target vector(s), the R1 target vector(s) is(are) used for reception beamforming for the second information; the R1 is a positive integer;
or further comprising:
receiving fourth information from the UE;
wherein the fourth information is used to determine at least one of the first antenna port set, or the P1 antenna port sets, the executing is transmitting.

10. The method according to claim 9, comprising:
receiving a second radio signal from the UE;
wherein the second radio signal is transmitted by R2 antenna port(s), the R2 antenna port(s) respectively corresponds(correspond) to R2 antenna virtualization vector(s); the R1 target vector(s) is(are) R1 antenna virtualization vector(s) out of the R2 antenna virtualization vector(s); the R2 is a positive integer greater than or equal to the R1, the executing is transmitting.

11. A User Equipment (UE) for dynamic scheduling, comprising:
a first processor, receiving first information from a base station;
a first receiver, receiving second information from the base station; and
a second processor, operating a first radio signal;
wherein the first information comprises Q field(s), each field of the Q field(s) corresponds to a respective target receiver of Q target receiver(s), the UE is a target receiver out of the Q target receiver(s); a first field out of the Q field(s) corresponds to the UE, the first field is used to determine a first antenna port set, the first field is one of the Q field(s); the first antenna port set comprises a positive integer number of antenna port(s), the second information is transmitted by an antenna port of the base station within the first antenna port set; the first information and the second information are both dynamically configured; wherein Q is a positive integer; the operating is receiving, or the operating is transmitting; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s); the first information and the second information are Downlink Control Information (DCI) respectively.

12. The UE according to claim 11, wherein the first processor further receives third information; wherein the third information is used to determine at least one of a position of the first field in the Q field(s), or a first ID; the first ID is an integer, the first ID is used to determine at least one of CRC bits for the first information, scrambling codes for the first information, or a scrambling code sequence for the first information;
or P1 antenna port sets are respectively used for P1 transmissions of the first information, the P1 is a positive integer greater than 1, each of the P1 antenna port sets comprises a positive integer number of antenna port(s).

13. The UE according to claim 12, wherein the first processor further detects target information identified by the first ID in a first time-frequency resource pool; wherein the first ID is used to determine at least one of CRC bits for the first information, scrambling codes for the first information, or a scrambling code sequence for the first information; the first information is the target information which is latest detected prior to the second information within the first time-frequency resource pool; the first ID is an integer;
or the first processor further receives a downlink RS, the downlink RS is transmitted by P2 antenna port sets; the P2 is a positive integer greater than or equal to the P1, each of the P2 antenna port sets comprises a positive integer number of antenna port(s); the P1 antenna port sets are a subset of the P2 antenna port sets.

14. The UE according to claim 11, wherein the first field is further used to determine a first vector group, the first vector group comprises R1 target vector(s), the first vector group comprises R1 target vector(s), the R1 target vector(s) is(are) used for reception beamforming for the second information; the R1 is a positive integer;
or the first processor further transmits fourth information; the fourth information is used to determine at least one of the first antenna port set, or the P1 antenna port sets.

15. The UE according to claim 14, wherein the first processor further transmits a second radio signal; the second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1.

16. A base station for dynamic scheduling, comprising:
a third processor, transmitting first information;
a first transmitter, transmitting second information;
a fourth processor, executing a first radio signal;
wherein the first information comprises Q field(s), each field of the Q field(s) corresponds to a respective target receiver of Q target receiver(s), a receiver for the second information is a target receiver out of the Q target receiver(s); a first field out of the Q field(s) corresponds to the receiver for the second information, the first field is used to determine a first antenna port set, the first field is one of the Q field(s); the first antenna port set comprises a positive integer number of antenna port(s), the second information is transmitted by an antenna port of the base station within the first antenna port set; the first information and the second information are both dynamically configured; wherein Q is a positive integer; the executing is transmitting, or the executing is receiving; the second information is used to determine scheduling information of the first radio signal, the scheduling information comprises at least one of time-frequency resources occupied, a transmitting antenna port set, a power control parameter, MCS, RV, NDI, or a HARQ Process Number; the transmitting antenna port set comprises a positive integer number of antenna port(s); the first information and the second information are Downlink Control Information (DCI) respectively.

17. The base station according to claim 16, wherein the third processor further transmits third information; the third information is used to determine at least one of a position of the first field in the Q field(s), or a first ID; the first ID is an integer, the first ID is used to determine at least one of CRC bits for the first information, scrambling codes for the first information, or a scrambling code sequence for the first information;
  or P1 antenna port sets are respectively used for P1 transmissions of the first information, the P1 is a positive integer greater than 1, each of the P1 antenna port sets comprises a positive integer number of antenna port(s).

18. The base station according to claim 17, wherein the third processor further transmits one piece or multiple pieces of target information in a first time-frequency resource pool; the first ID is used to determine at least one of CRC bits for the first information, scrambling codes for the first information, or a scrambling code sequence for the first information; the first information is the target information which is latest transmitted prior to the second information within the first time-frequency resource pool; the first ID is an integer;
  or the third processor further transmits a downlink RS, the downlink RS is transmitted by P2 antenna ports; the P2 is a positive integer greater than or equal to the P1, each of the P2 antenna port sets comprises a positive integer number of antenna port(s); the P1 antenna port sets are a subset of the P2 antenna port sets.

19. The base station according to claim 16, wherein the first field is further used to determine a first vector group, the first vector group comprises R1 target vector(s), the first vector group comprises R1 target vector(s), the R1 target vector(s) is(are) used for reception beamforming for the second information; the R1 is a positive integer;
  or the third processor further receives fourth information; the fourth information is used to determine at least one of the first antenna port set, or the P1 antenna port sets, the executing is transmitting.

20. The base station according to claim 19, wherein the third processor further receives a second radio signal; the second radio signal is transmitted by R2 antenna port(s), the R2 antenna port(s) corresponds(correspond) to R2 antenna virtualization vector(s) respectively; the R1 target vector(s) is(are) R1 antenna virtualization vector(s) out of the R2 antenna virtualization vector(s); the R2 is a positive integer greater than or equal to the R1, the executing is transmitting.

* * * * *